(12) United States Patent
Chen

(10) Patent No.: US 11,363,898 B1
(45) Date of Patent: Jun. 21, 2022

(54) BUCKLING STRUCTURE FOR BOTTLE CAGE

(71) Applicant: SHIN FANG PLASTIC INDUSTRIAL CO., LTD., Taichung (TW)

(72) Inventor: Yen-Yu Chen, Taichung (TW)

( * ) Notice: Subject to any disclaimer, the term of this patent is extended or adjusted under 35 U.S.C. 154(b) by 13 days.

(21) Appl. No.: 17/152,050

(22) Filed: Jan. 19, 2021

(51) Int. Cl.
| A47G 23/02 | (2006.01) |
| B62J 11/04 | (2020.01) |
| F16M 13/02 | (2006.01) |

(52) U.S. Cl.
CPC ......... *A47G 23/0241* (2013.01); *F16M 13/02* (2013.01); *B62J 11/04* (2020.02)

(58) Field of Classification Search
CPC .......... B62J 11/22; B62J 9/27; Y10S 224/926; A47G 23/0241; F16M 13/02
USPC ...... 248/103, 219.4, 222.13, 223.41, 223.51, 248/224.61, 224.7
See application file for complete search history.

(56) References Cited

U.S. PATENT DOCUMENTS

| 4,830,240 A * | 5/1989 | Tackles | B62J 11/04 224/462 |
| 5,332,183 A * | 7/1994 | Kagayama | B62J 6/03 248/223.41 |
| 6,036,071 A * | 3/2000 | Hartmann | B60R 11/00 224/555 |
| 6,811,348 B1 * | 11/2004 | Meyer | A42B 3/04 403/324 |
| 9,115,887 B2 * | 8/2015 | Chuang | B62J 11/04 |
| 9,862,445 B2 * | 1/2018 | Chuang | B62J 11/22 |
| 9,944,209 B1 * | 4/2018 | Carnevali | B60N 3/108 |
| 10,307,006 B2 * | 6/2019 | Knoll | B67B 7/16 |
| 10,343,738 B2 * | 7/2019 | Chuang | B62J 11/04 |
| 10,415,745 B2 * | 9/2019 | Roskamp | F16M 11/22 |
| 2004/0256428 A1 * | 12/2004 | Meggiolan | B62J 11/04 224/425 |
| 2005/0156001 A1 * | 7/2005 | Dal Pra | B62M 25/08 280/281.1 |
| 2010/0084531 A1 * | 4/2010 | Schuchman | B60N 3/103 248/311.2 |

(Continued)

FOREIGN PATENT DOCUMENTS

| DE | 202015000270 U1 * | 4/2015 | ............. B62J 11/00 |
| EP | 3556642 B1 * | 1/2022 | ............. B62H 5/00 |

(Continued)

*Primary Examiner* — Patrick D Hawn
(74) *Attorney, Agent, or Firm* — Egbert, McDaniel & Swartz, PLLC

(57) ABSTRACT

Disclosed is aa buckling structure for a bottle cage, which includes a main frame and a buckling structure, wherein the main frame is used for setting a bottle. The buckling structure is connected to the main frame, and the main frame is positioned and arranged on a setting object through the buckling structure. The buckling structure includes a female fastener and a male fastener, wherein the male fastener is connected to the main frame, and the male fastener is located between the main frame and the female fastener. The male fastener is detachably slidably arranged on the female fastener, and the female fastener is arranged on the setting object, so that the main frame is positioned and arranged on the setting object, and the main frame is easily installed and with high positioning reliability.

8 Claims, 13 Drawing Sheets

(56) References Cited

U.S. PATENT DOCUMENTS

| | | | |
|---|---|---|---|
| 2011/0147424 A1* | 6/2011 | Brown | B62J 11/04 224/567 |
| 2014/0263507 A1* | 9/2014 | Wang | B62J 11/04 224/414 |
| 2021/0251372 A1* | 8/2021 | Chu | A45F 5/021 |

FOREIGN PATENT DOCUMENTS

| | | | |
|---|---|---|---|
| TW | M516543 U | | 2/2016 |
| TW | M555819 U | | 2/2018 |
| TW | M595613 U | * | 5/2020 |

* cited by examiner

BUCKLING STRUCTURE FOR BOTTLE CAGE

CROSS-REFERENCE TO RELATED U.S. APPLICATIONS

Not applicable.

BACKGROUND OF THE INVENTION

1. Field of the Invention

The present invention relates generally to a bottle cage for setting a bottle, and more particularly to a buckling structure for a bottle cage.

2. Description of Related Art Including Information Disclosed Under 37 CFR 1.97 and 37 CFR 1.98

The bottle cage is an object for setting a bottle. The bottle cage is usually arranged on one side of a tube, and the tube is generally the down tube or stem of bicycle frame. The bottle is arranged on the bottle cage for the cyclist to have access to water when riding a bicycle.

The bottle cage can be bolted to the bicycle frame, and it is convenient for the cyclist to pick and place the bottle when riding a bicycle. However, it is inconvenient to arrange the bottle cage on the frame or to take down the bottle cage from the frame.

There is another kind of bottle cage with one to several girdles, and the girdle surrounds the down tube or stem of the frame, so as to install the bottle cage on the frame. The bottle cage is positioned by the friction between the bottle cage and the girdle and the frame, and the bottle cage positioning reliability is poor.

BRIEF SUMMARY OF THE INVENTION

The primary objective of the present invention is to provide a buckling structure for a bottle cage, which is easily installed with high positioning reliability.

Based on said objective, the technical characteristic of problem solving of the present invention is that the buckling structure for a bottle cage comprises a main frame and a buckling structure, wherein the main frame is used for setting a bottle. The buckling structure is connected to the main frame, so that the main frame is positioned and arranged on a setting object through the buckling structure.

The buckling structure comprises a female fastener and a male fastener, wherein the male fastener is connected to the main frame. The male fastener is located between the main frame and the female fastener. The male fastener is detachably and slidably arranged on the female fastener, and arranged on the setting object through the female fastener, so that the main frame is positioned and arranged on the setting object.

The female fastener comprises a first main body and a limiting part, wherein several punch holes penetrate the first main body, and several bolts optionally penetrate the corresponding punch holes, so that the female fastener is locked on the setting object by the bolts. The first main body forms two elongated sliding grooves and a limiting wall. The sliding grooves are laterally opposite to each other. One end in the elongated direction of the sliding groove is closed, the other end is open to the outside. The limiting wall is located between the sliding grooves. The limiting part is connected to the first main body, so that the limiting part is elastically actuated against the first main body.

The male fastener includes a second main body, wherein the second main body is connected to the backside of the main frame, a wing laterally protrudes on both sides of the second main body respectively, so that the wings enter the sliding grooves through the open end of the sliding grooves respectively, and the limiting part limits the second main body.

The first main body is provided with two stoppers, the stoppers are located on the side of the sliding grooves facing the main frame respectively, so that the stoppers stop the wings respectively, and the stopper and the limiting wall oppositely limit the second main body.

A first surface is formed on the side of the stopper facing the sliding groove. The first surface has a first end and a second end. The first end is located at the open end of the sliding groove. The second end is located at the closed end of the sliding groove. In the direction normal to the limiting wall, the distance between the first surface and the limiting wall decreases from the first end to the second end. The wing forms a second surface and a third surface, the second surface is located on the side of the wing facing the main frame, and the second surface extends to one end of the wing. The third surface is located on the opposite side of the second surface. The thickness of the wing between the second surface and the third surface increases from one end of the wing to the other end, so as to enhance the stability of the combination of the male fastener and the female fastener and the handiness of slidably arranging the male fastener on the female fastener.

DETAILED DESCRIPTION OF THE INVENTION

Figure 1:
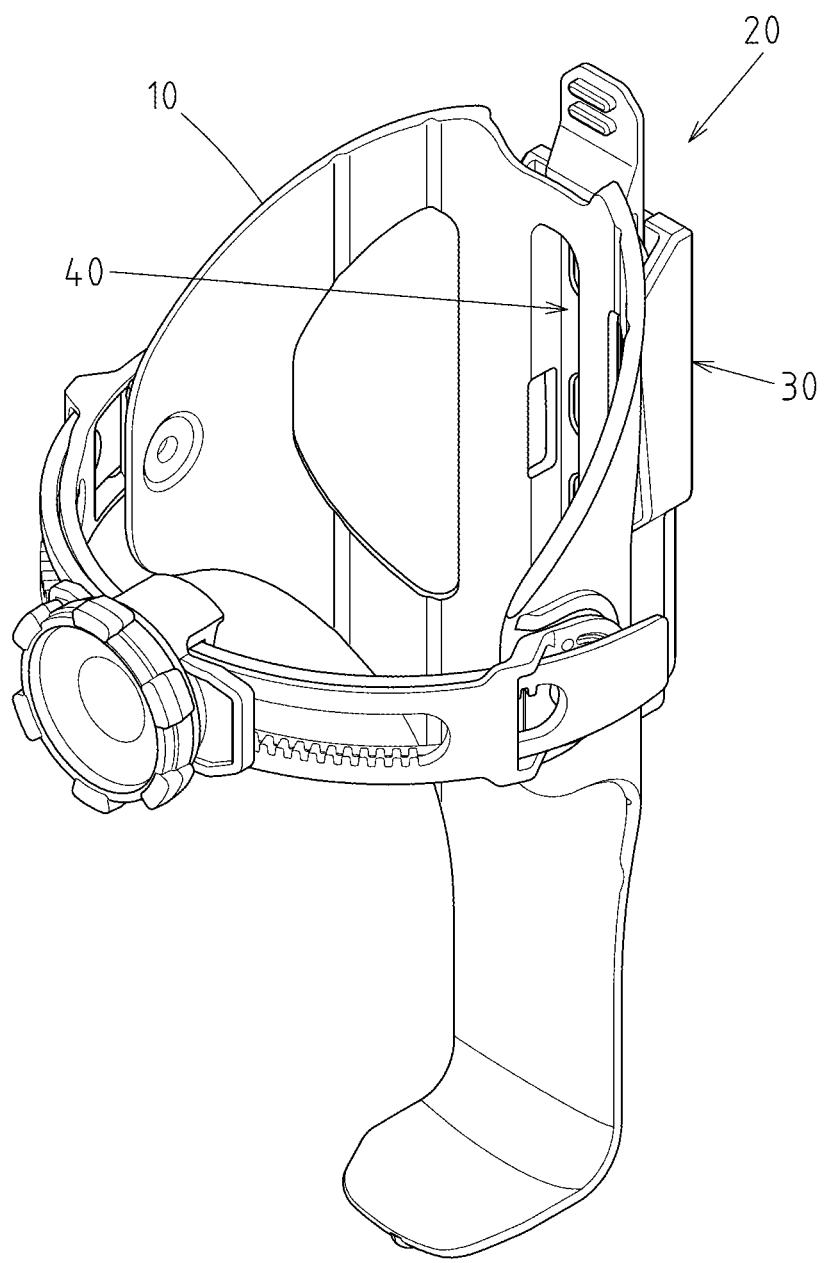
FIG. 1 is a stereogram of the preferred embodiment of the present invention.
Figure 2:
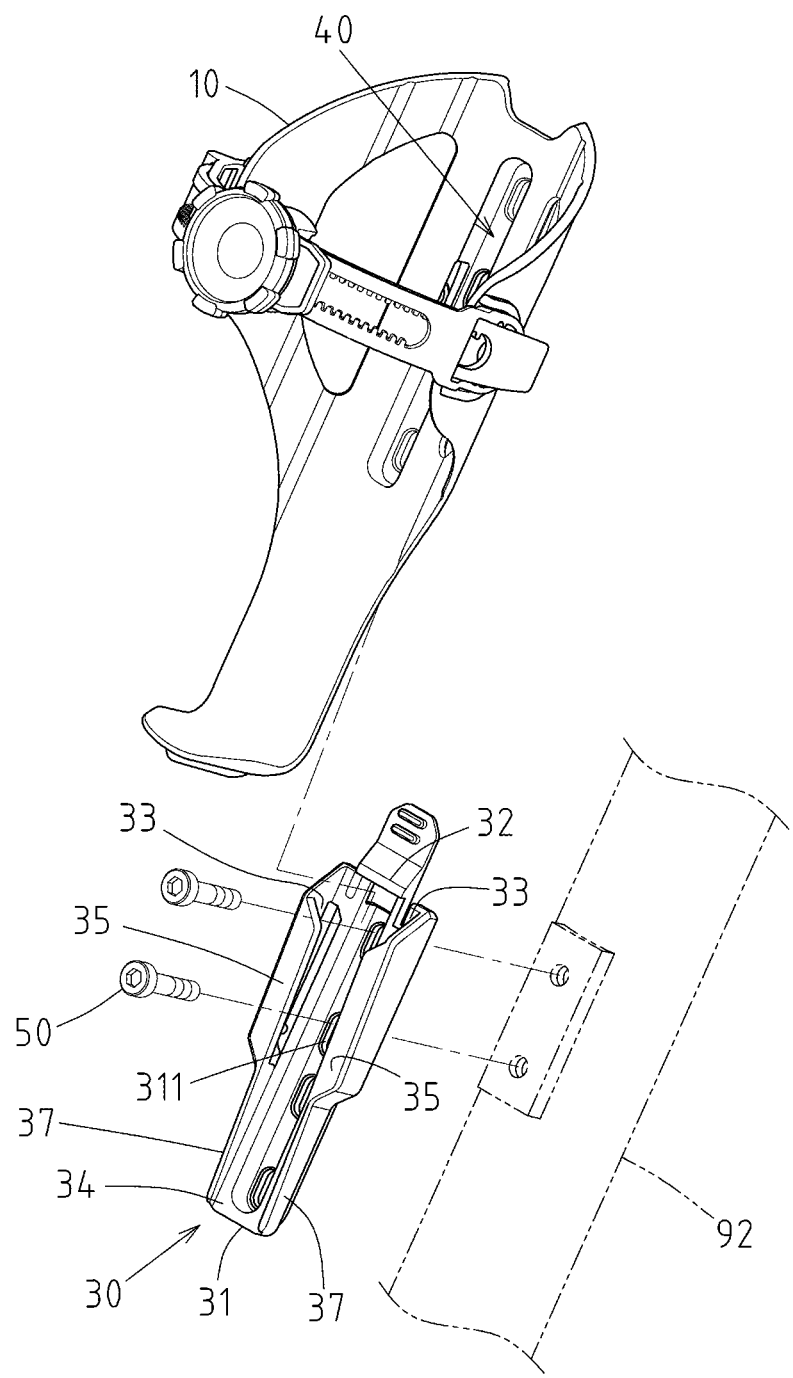
FIG. 2 is a three-dimensional exploded view of the preferred embodiment of the present invention.
Figure 3:
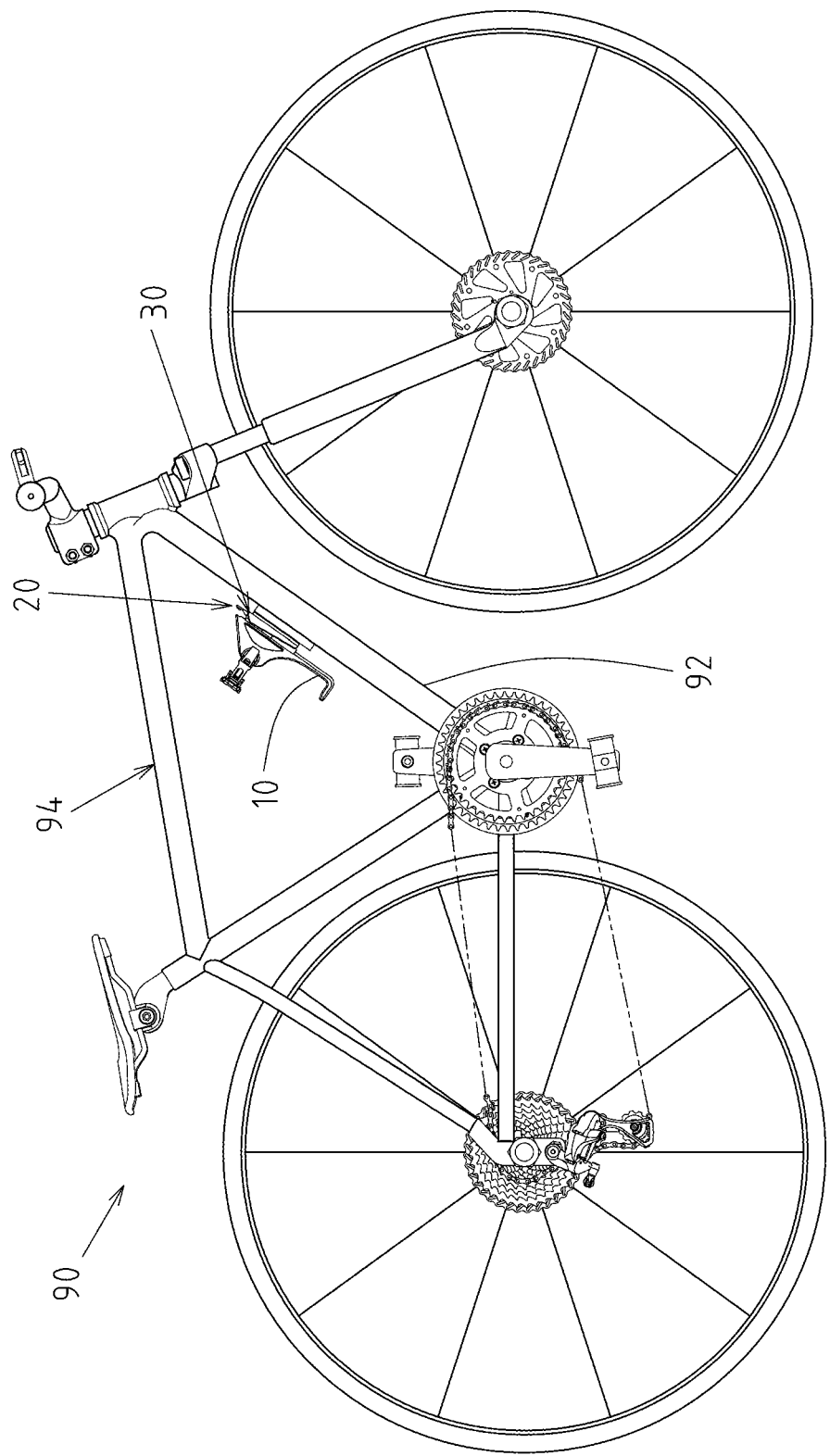
FIG. 3 is a side view of the preferred embodiment of the present invention arranged on a bicycle.
Figure 4:
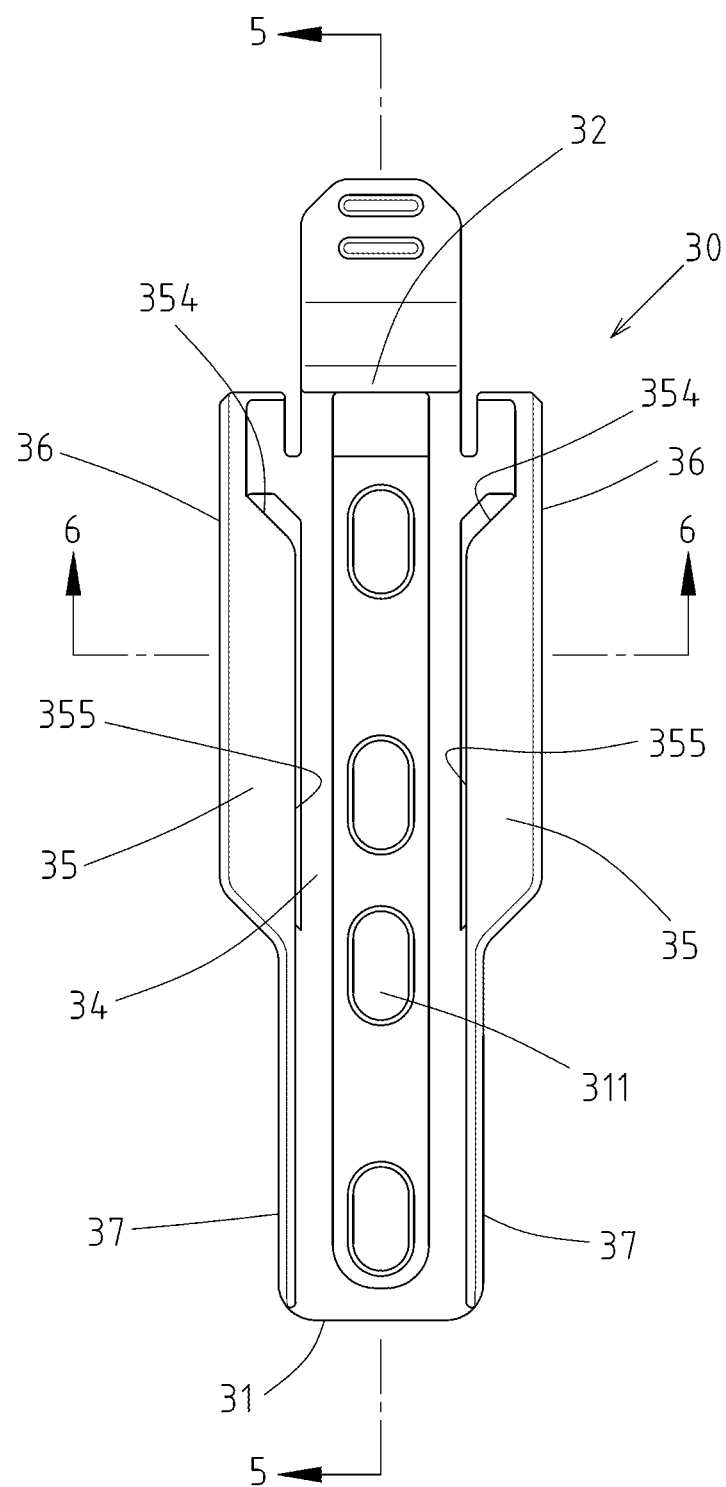
FIG. 4 is a front view of female fastener of the preferred embodiment of the present invention.
Figure 5:
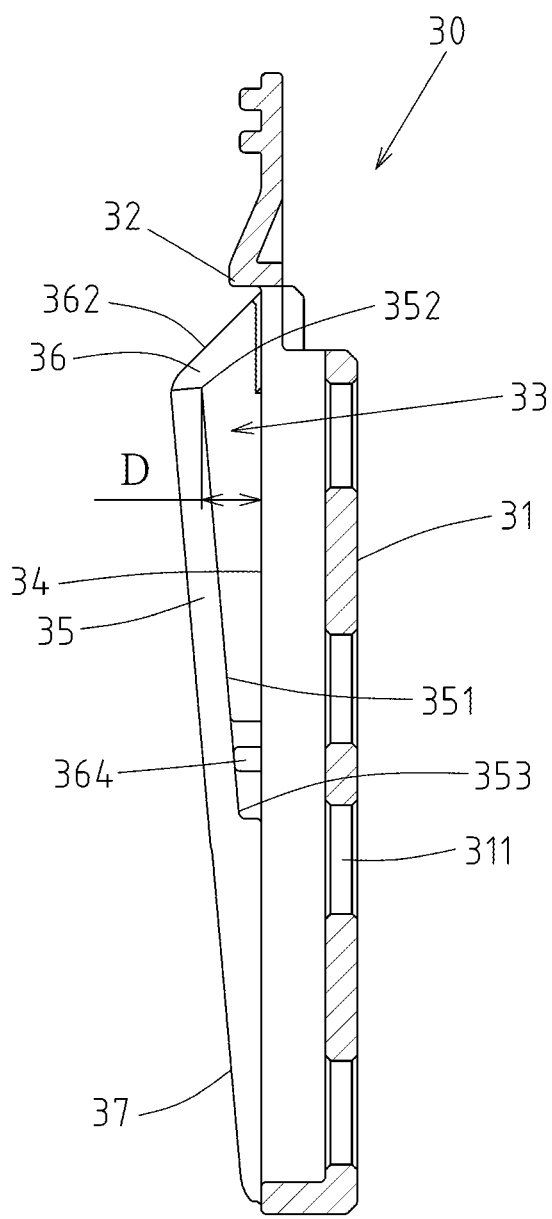
FIG. 5 is the 5-5 sectional view of FIG. 4.
Figure 6:
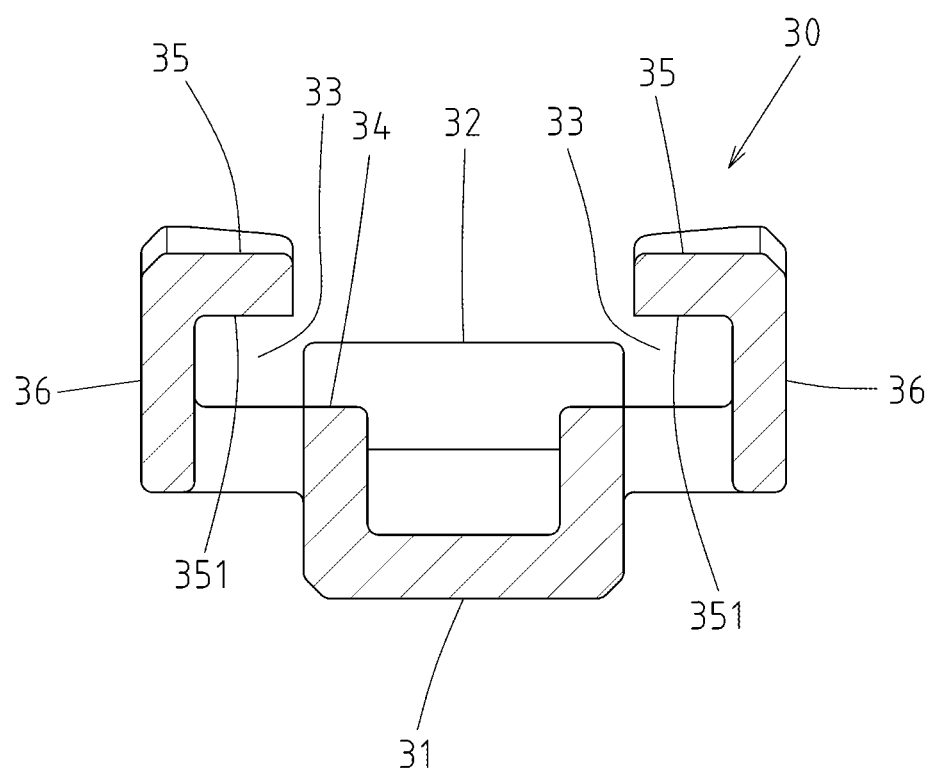
FIG. 6 is the 6-6 sectional view of FIG. 4.
Figure 7:
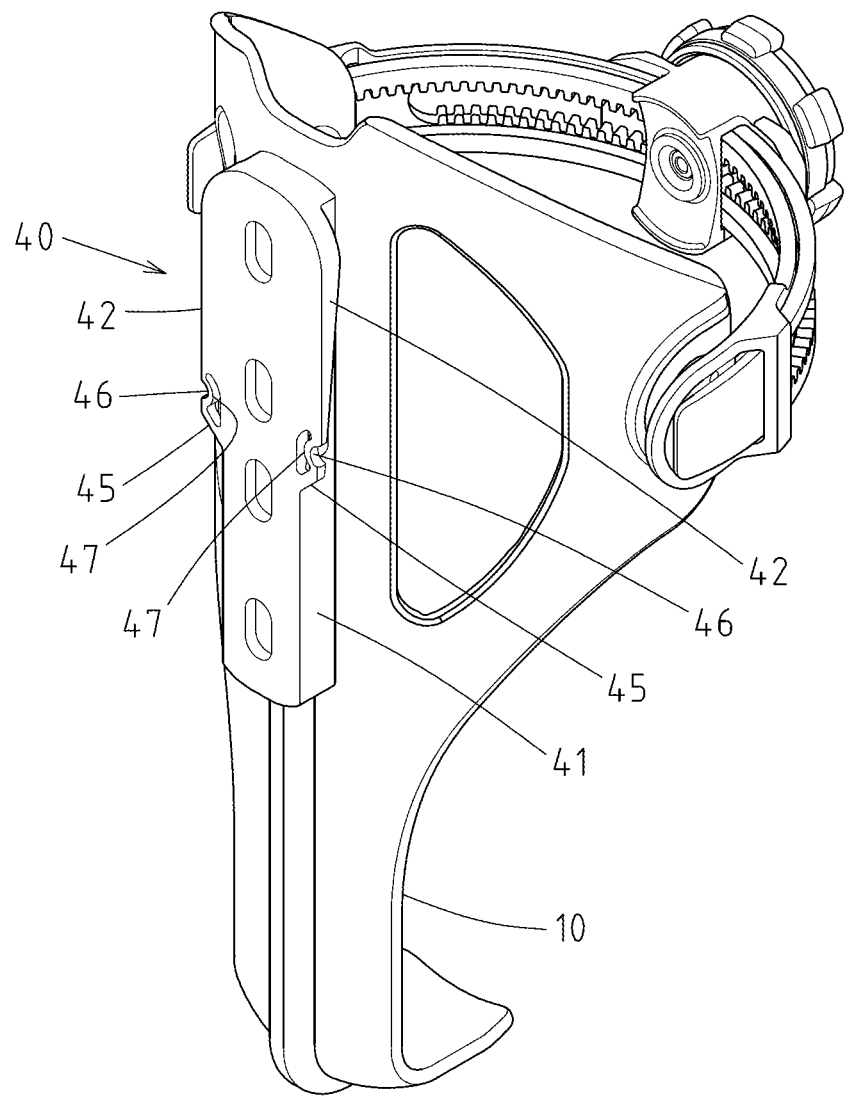
FIG. 7 is a stereogram from another viewing angle of the main frame and male fastener in the preferred embodiment of the present invention.
Figure 8:
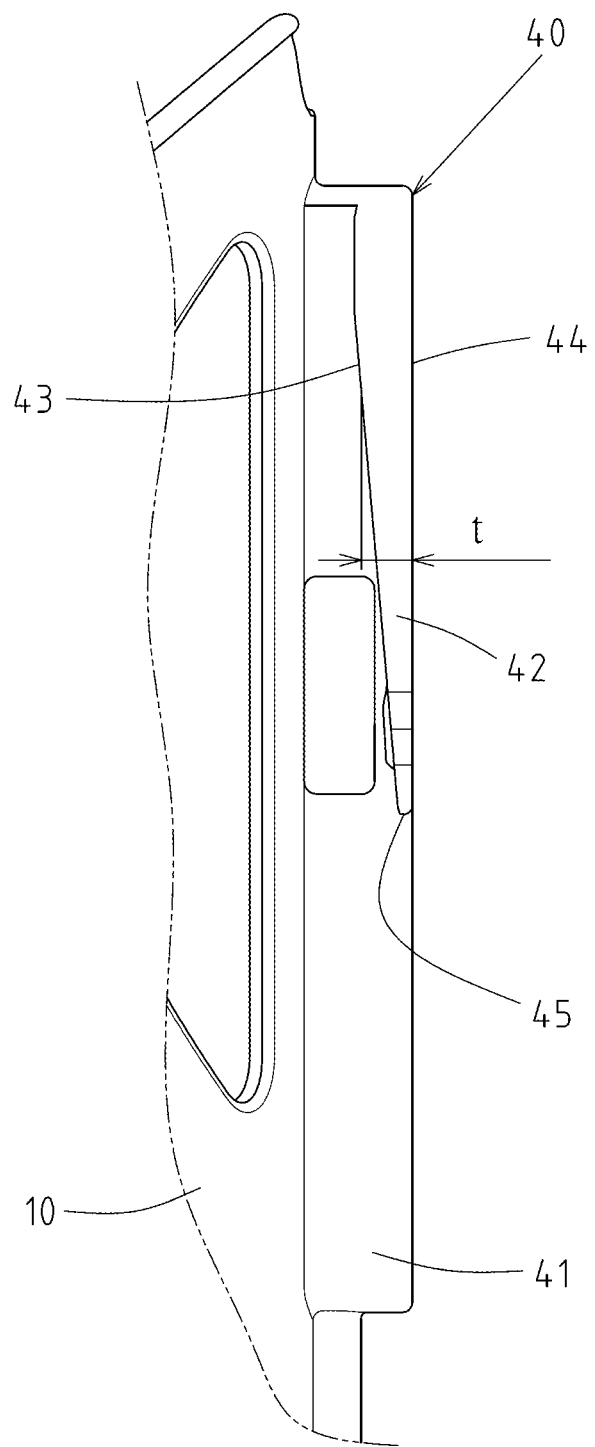
FIG. 8 is a right view of male fastener in the preferred embodiment of the present invention.
Figure 9:
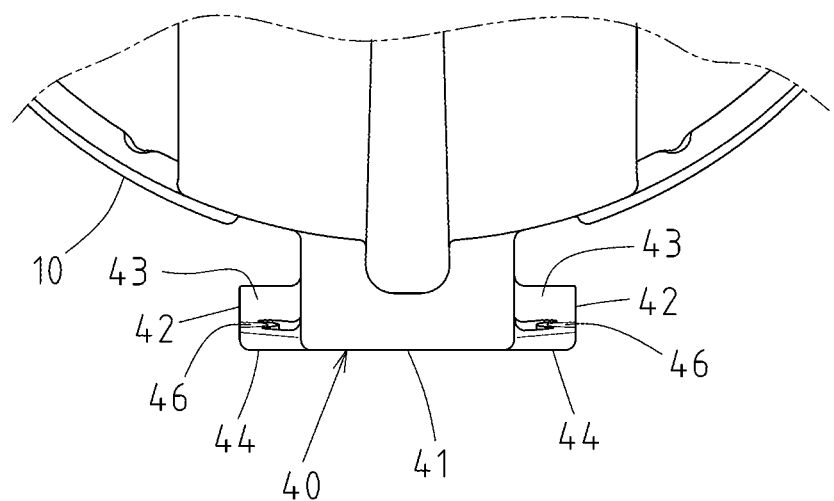
FIG. 9 is the upward view of male fastener in the preferred embodiment of the present invention.

As shown in FIG. 1 to FIG. 13, the preferred embodiment of the buckling structure for a bottle cage includes a main frame 10 and a buckling structure 20, wherein the main frame 10 is used for setting a bottle (not shown in the figure). The main frame 10 shown in the figure is only one feasible specific demonstration, not to limit the explanation of the present invention, and the main frame 10 can be thought of by the persons from related domains, the specific construction of the main frame 10 will not be detailed. The buckling structure 20 is connected to the main frame 10, so that the main frame 10 is positioned and arranged on a setting object 92 through the buckling structure 20. FIG. 3 shows the setting object 92 is the down tube of the frame 94 of a bicycle 90, demonstrating the preferred embodiment arranged on the bicycle 90, the setting object 92 can be a shaft or a pipe arranged on ships or automobile, and the setting object 92 can be other objects. Hereby, the preferred embodiment can be used to locate the bottle in different objects or an unstable dynamic environment.

The buckling structure 20 comprises a female fastener 30 and a male fastener 40, wherein the male fastener 40 is connected to the main frame 10, the male fastener 40 is located between the main frame 10 and the female fastener 30. The male fastener 40 is detachably and slidably arranged on the female fastener 30, and arranged on the setting object 92 through the female fastener 30, so that the main frame 10 is positioned and arranged on the setting object 92.

The female fastener 30 comprises a first main body 31 and a limiting part 32, wherein several punch holes 311 penetrate the first main body 31, several bolts 50 optionally penetrate the corresponding punch holes 311, so that the female fastener 30 is locked on the setting object 92 by the bolts 50. The first main body 31 forms two elongated sliding grooves 33 and a limiting wall 34. The sliding grooves 33 are laterally opposite to each other. One end in the elongated direction of the sliding groove 33 is closed, the other end is open to the outside. The limiting wall 34 is located between the sliding grooves 33. The limiting wall 34 is U shaped. The limiting part 32 is connected to the first main body 31, so that the limiting part 32 is elastically actuated against the first main body 31.

The male fastener 40 includes an elongated second main body 41, wherein the second main body 41 is connected to the backside of the main frame 10, a wing 42 laterally protrudes on both sides of the second main body 41 respectively, so that the wings 42 enter the sliding grooves 33 through the open end of the sliding grooves 33 respectively, and the limiting part 32 limits the second main body 41. The second main body 41 is integrated with the main frame 10.

The first main body 31 is provided with two stoppers 35, the stoppers 35 are located on the side of the sliding grooves 33 facing the main frame 10 respectively, so that the stoppers 35 stop the wings 42 respectively, and the stopper 35 and the limiting wall 34 oppositely limit the second main body 41.

A first surface 351 is formed on the side of the stopper 35 facing the sliding groove 33. The first surface 351 has a first end 352 and a second end 353. The first end 352 is located at the open end of the sliding groove 33. The second end 353 is located at the closed end of the sliding groove 33. In the direction normal to the limiting wall 34, the distance D between the first surface 351 and the limiting wall 34 decreases from the first end 352 to the second end 353. The wing 42 forms a second surface 43 and a third surface 44. The second surface 43 is located on the side of the wing 42 facing the main frame 10, and the second surface 43 extends to one end of the wing 42. The third surface 44 is located on the opposite side of the second surface 43. The thickness t of the wing 42 between the second surface 43 and the third surface 44 increases from one end of the wing 42 to the other end, so as to enhance the stability of the combination of the male fastener 40 and the female fastener 30 and the handiness of slidably arranging the male fastener 40 on the female fastener 30.

Figure 10:
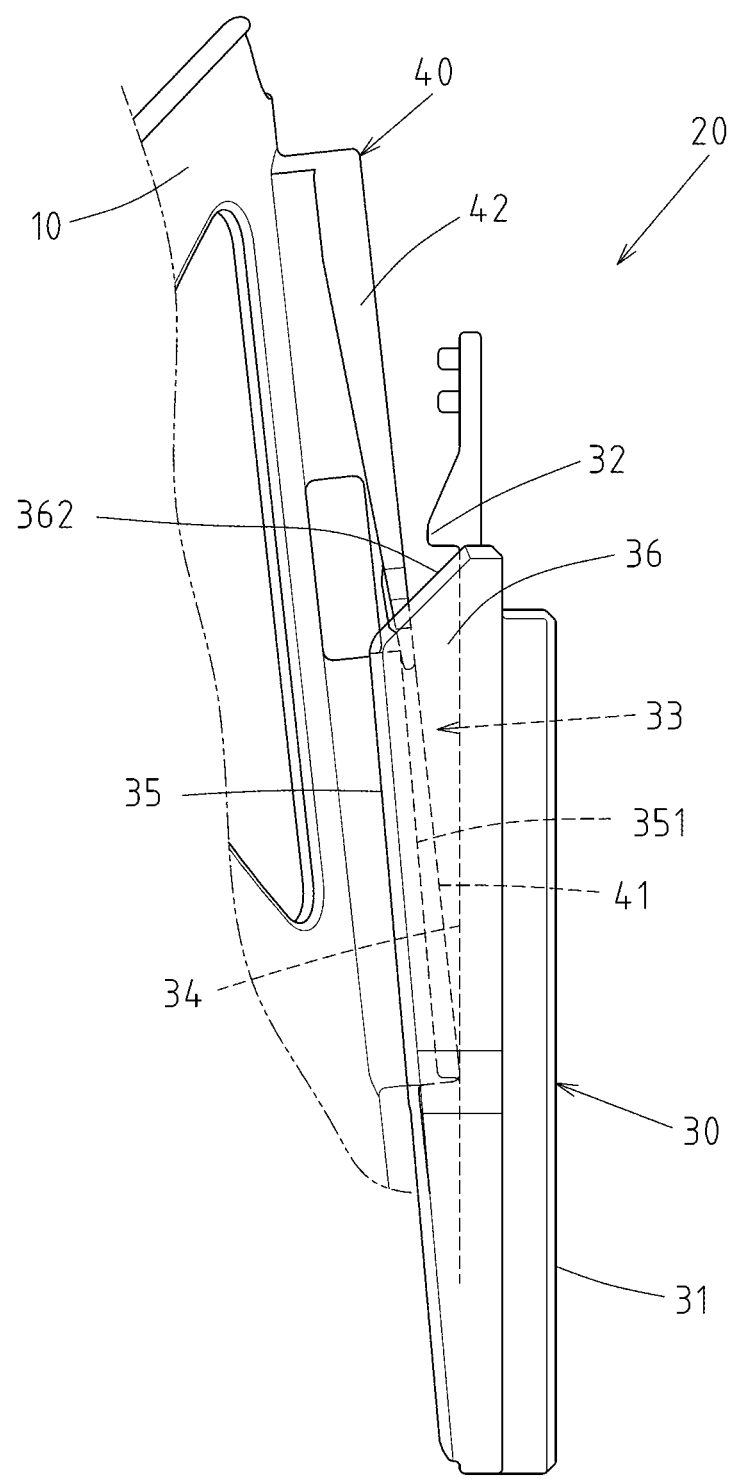
FIG. 10 is a schematic diagram (1) of actuation of combination of female fastener and male fastener in the preferred embodiment of the present invention.
Figure 11:
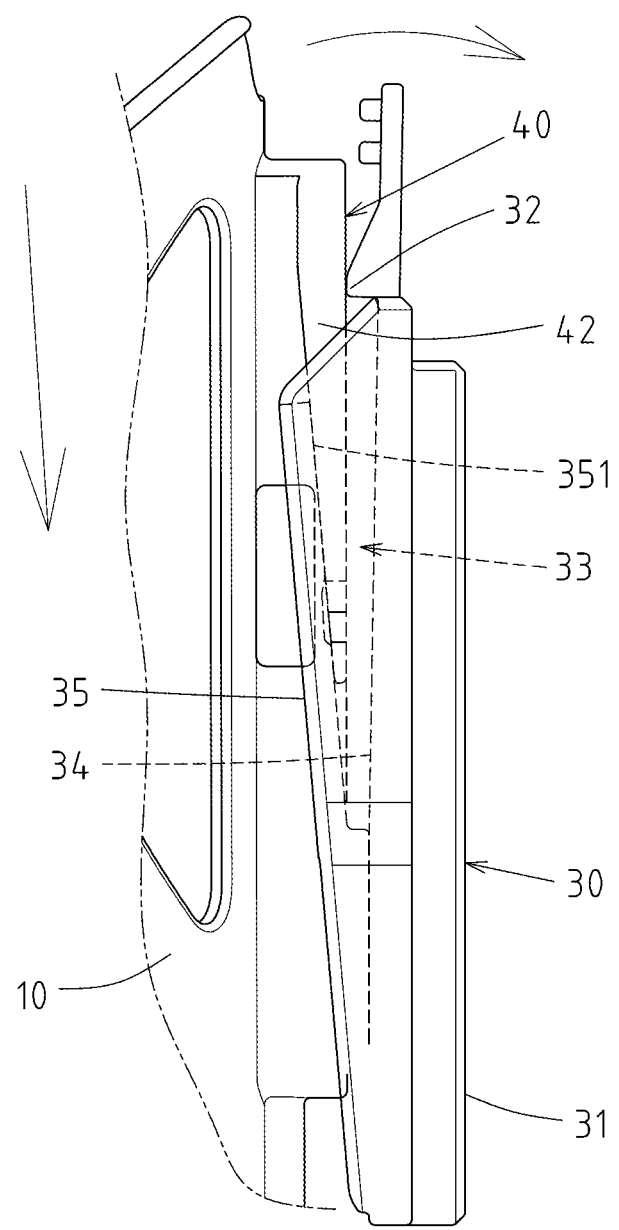
FIG. 11 is a schematic diagram (2) of actuation of combination of female fastener and male fastener in the preferred embodiment of the present invention.
Figure 12:
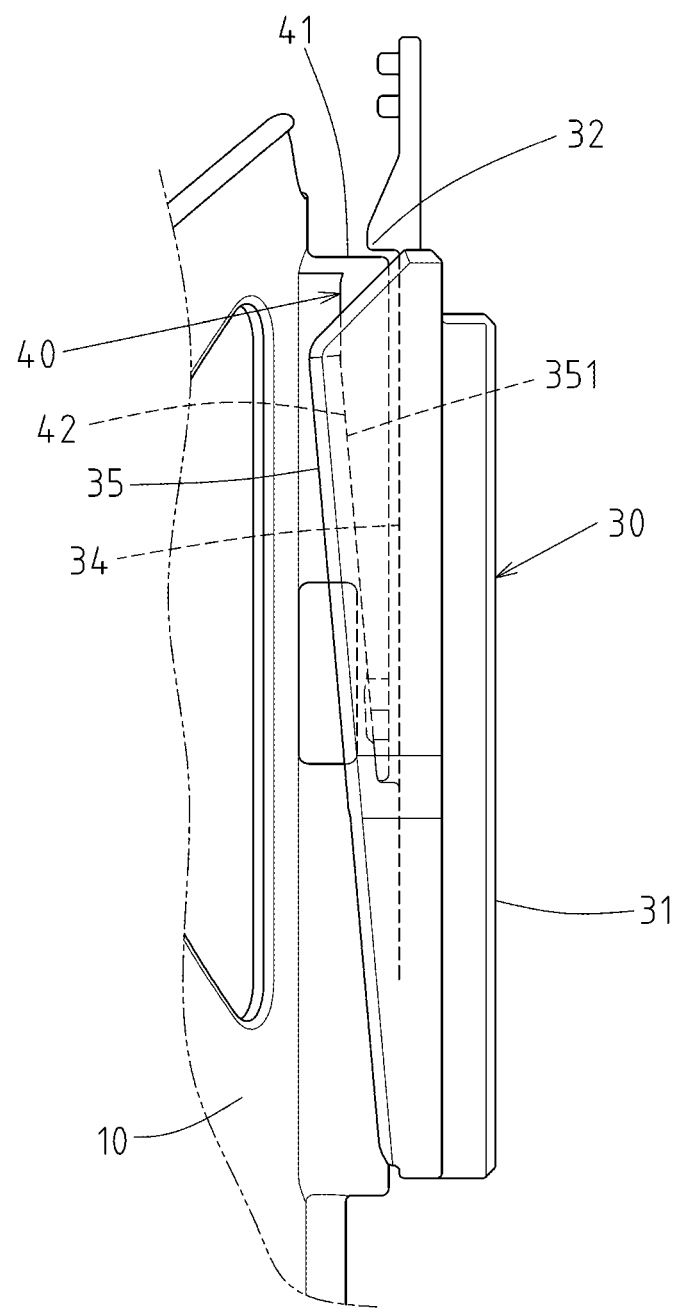
FIG. 12 is a right view of the preferred embodiment of the present invention.
Figure 13:
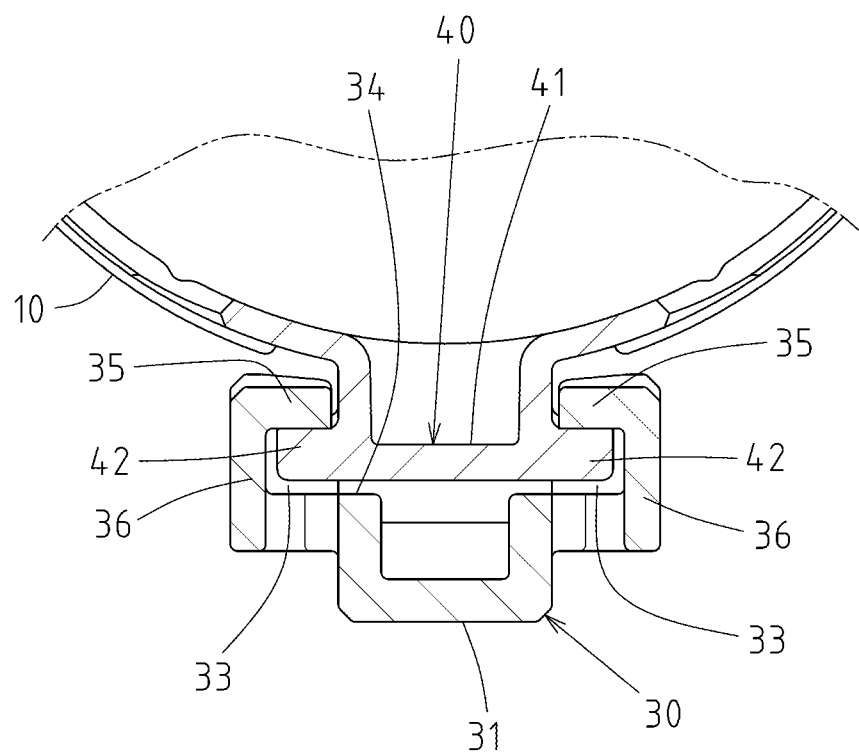
FIG. 13 is a section view of the preferred embodiment of the present invention.

Let the thinner end of the thickness t of the wing 42 be inlet end 45. When the male fastener 40 is arranged on the female fastener 30, as shown in FIG. 10, the inlet end 45 of the wings 42 enters the sliding grooves 33 through one end of the sliding grooves 33 open to the outside. The limiting wall 34 limits and guides the second main body 41, and the stoppers 35 stop the wings 42 respectively, as shown in FIG. 11. As the wing 42 penetrates into the sliding groove 33 gradually, the second main body 41 presses the limiting part 32, the limiting part 32 is elastically actuated, the wing 42 continues to slide in the sliding groove 33, as shown in FIG. 12. When the male fastener 40 is installed, the limiting part 32 is elastically restored, the limiting part 32 limits the second main body 41, the male fastener 40 cannot be actuated reversely to depart from the female fastener 30.

As the demonstration of use shown in FIG. 3, the weight of the bottle and the vibration of the bicycle 90 in motion will not induce displacement of the main frame 10, when the user takes and places the bottle, the limiting part 32 limits the second main body 41, so that the relative force of the bottle on the main frame 10 will not detach the male fastener 40 from the female fastener 30, or influence the positioning of the main frame 10, favorable for the cyclist to take and place the bottle in the running state of the bicycle 90. When the user is to leave the bicycle 90 with the bottle, the female fastener 30 can be removed from the setting object 92 without a tool, as long as the male fastener 40 is removed from the female fastener 30, the bottle can be detached from the bicycle 90 together with the main frame 10 and the male fastener 40, and the male fastener 40 is arranged on another female fastener 30, enhancing the convenience of carrying the bottle and arranging it on different setting objects. Hereby, the main frame 10 is easy to be installed with high positioning reliability, meeting the fundamental purpose of the present invention.

On the other hand, the stoppers 35 and the limiting wall 34 oppositely limit the second main body 41 respectively, the stoppers 35 lean against the wings 42 respectively, so that the female fastener 30 and the male fastener 40 are unlikely to shake each other, the stability of the combination of the male fastener 40 and the female fastener 30 is enhanced. The wing 42 and the sliding groove 33 are opposite to each other in space, the thinner inlet end 45 of the thickness t enters the sliding groove 33 through the open end of the sliding groove 33, and the distance D at the open end of the sliding groove 33 is larger, the wing 42 can easily enter the sliding groove 33, so as to enhance the handiness of slidably arranging the male fastener 40 on the female fastener 30.

The limiting part 32 is adjacent to the open end of the sliding grooves 33, and the limiting part 32 is opposite to one end of the second main body 41, so as to limit the second main body 41, avoiding the wing 42 departing from the sliding groove 33.

A first bevel edge 354 is formed at one end of the stopper 35, the first bevel edge 354 is adjacent to the first end 352, the mutually opposite sides of the stoppers 35 form a side edge 355 respectively, an obtuse angle is formed between the first bevel edge 354 and the side edge 355. Each first bevel edge 354 guides the second main body 41, so that the second main body 41 is easy to enter in between the stoppers 35, guiding the wings 42 to align with the sliding grooves 33 respectively, so that the wing 42 is easy to enter the sliding groove 33.

The stoppers 35 are connected to a side stopping part 36 respectively. The side stopping parts 36 are laterally adjacent to the sliding grooves 33 respectively, and the sliding grooves 33 are located between the side stopping parts 36 respectively. A second bevel edge 362 is formed at one end of the side stopping part 36. The second bevel edge 362 is adjacent to the first end 352. An acute angle is formed between the second bevel edge 362 and the limiting wall 34. Hereby, the side stopping part 36 avoids the second main body 41 through the second bevel edge 362. The second main body 41 is easy to enter in between the stopper 35 and the limiting part 32, the handiness of moving the wing 42 into the sliding groove 33 is enhanced.

A bulge 364 protrudes from the side stopping part 36 into the sliding groove 33. The wings 42 laterally form a slot 46 respectively, the bulges 364 enter the slots 46 respectively, so as to enhance the reliability of the combination of the male fastener 40 and the female fastener 30. Furthermore, the wings 42 form a curved part 47 respectively. The slots 46 are formed on one side of the curved parts 47 respectively. When the bulges 364 enter the slots 46 respectively, the curved parts 47 elastically buckle the bulges 364 respectively. The slots 46 are adjacent to the inlet end 45.

Two sidewalls 37 protrude on the side of the limiting wall 34 facing the second main body 41, and the sidewalls 37 are formed on both sides of the second main body 41 respectively, hereby, the sidewalls 37 laterally stop the second main body 41 respectively, so as to enhance the lateral positioning reliability of the male fastener 40.

The sliding grooves 33 penetrate the first main body 31 respectively, so that the portion of the first main body 31 between the sliding grooves 33 and the limiting part 32 limits the wing 42.

I claim:

1. A buckling structure for a bottle cage, including a main frame and a buckling structure, wherein said main frame is used for setting a bottle, said buckling structure is connected to said main frame, so that said main frame is positioned and arranged on a setting object through said buckling structure;

said buckling structure comprises a female fastener and a male fastener wherein said male fastener is connected to said main frame, said male fastener is located between said main frame and said female fastener, said male fastener is detachably and slidably arranged on said female fastener, and arranged on the setting object through said female fastener, so that said main frame is positioned and arranged on said setting object;

said female fastener comprises a first main body and a limiting part, wherein several punch holes penetrate said first main body, several bolts optionally penetrate said corresponding punch holes, so that said female fastener is locked on said setting object by the bolts, the first main body forms two elongated sliding grooves and a limiting wall, said sliding grooves are laterally opposite to each other, one end in the elongated direction of said sliding groove is closed, the other end is open to the outside, said limiting wall is located between said sliding grooves, said limiting part is connected to said first main body, so that said limiting part is elastically actuated against said first main body;

said male fastener includes a second main body, wherein said second main body is connected to the backside of said main frame, a wing laterally protrudes on both sides of said second main body respectively, so that said wings enter said sliding grooves through the open end of said sliding grooves respectively, and said limiting part limits said second main body;

said first main body is provided with two stoppers, said stoppers are located on the side of said sliding grooves facing said main frame respectively, so that said stoppers stop said wings respectively, and said stopper and said limiting wall oppositely limit said second main body;

a first surface is formed on the side of said stopper facing said sliding groove, said first surface has a first end and a second end, said first end is located at the open end of said sliding groove, said second end is located at the closed end of said sliding groove, in the direction normal to said limiting wall, the distance between said first surface and said limiting wall decreases from said first end to said second end, said wing forms a second surface and a third surface, said second surface is located on the side of said wing facing said main frame, and said second surface extends to one end of said wing, said third surface is located on the opposite side of said second surface, the thickness of said wing between said second surface and said third surface increases from one end of said wing to the other end, so as to enhance the stability of the combination of said male fastener and said female fastener and the handiness of slidably arranging said male fastener on said female fastener.

2. The buckling structure for a bottle cage defined in claim 1, wherein said limiting part is adjacent to the open end of said sliding grooves, and said limiting part is opposite to one end of said second main body, so as to limit said second main body, avoiding said wing departing from said sliding groove.

3. The buckling structure for a bottle cage defined in claim 2, wherein a first bevel edge is formed at one end of said stopper, said first bevel edge is adjacent to said first end, a side edge is formed on the mutually opposite sides of said stoppers respectively, an obtuse angle is formed between said first bevel edge and said side edge, so that said wing can easily enter said sliding groove.

4. The buckling structure for a bottle cage defined in claim 2, wherein said stoppers are connected to a side stopping part respectively, said side stopping parts are laterally adjacent to said sliding grooves respectively, and said sliding grooves are located between said side stopping parts respectively;

a second bevel edge is formed at one end of said side stopping part, said second bevel edge is adjacent to said first end, an acute angle is formed between said second bevel edge and said limiting wall, so that said second main body can easily enter in between said stopper and said limiting part, the handiness of moving said wing into said sliding groove is enhanced.

5. The buckling structure for a bottle cage defined in claim 4, wherein a bulge protrudes from said side stopping part into said sliding groove, said wings laterally form a slot respectively, said bulges enter said slots respectively, so as to enhance the reliability of the combination of said male fastener and said female fastener.

6. The buckling structure for a bottle cage defined in claim 5, wherein the thinner end of thickness of said wing is inlet end, said slot is adjacent to the inlet end.

7. The buckling structure for a bottle cage defined in claim 1, wherein two sidewalls protrude on the side of said limiting wall facing said second main body, said sidewalls are formed on both sides of said second main body respectively, so as to enhance the lateral positioning reliability of said male fastener.

8. The buckling structure for a bottle cage defined in claim 1, wherein said sliding grooves penetrate said first main body respectively.

* * * * *